United States Patent
Finn et al.

(10) Patent No.: US 12,061,119 B2
(45) Date of Patent: Aug. 13, 2024

(54) INFRARED PRESENCE DETECTOR SYSTEM

(71) Applicant: Carrier Corporation, Palm Beach Gardens, FL (US)

(72) Inventors: Alan Matthew Finn, Hebron, CT (US); Ziyou Xiong, Wethersfield, CT (US); Nicholas Charles Soldner, Southbury, CT (US); Joseph V. Mantese, Ellington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/079,089

(22) Filed: Dec. 12, 2022

(65) Prior Publication Data

US 2023/0103541 A1 Apr. 6, 2023

Related U.S. Application Data

(62) Division of application No. 16/069,062, filed as application No. PCT/US2017/012929 on Jan. 11, 2017, now Pat. No. 11,525,735.

(Continued)

(51) Int. Cl.
*G01J 5/00* (2022.01)
*G01J 5/02* (2022.01)
(Continued)

(52) U.S. Cl.
CPC .............. *G01J 5/0025* (2013.01); *G01J 5/026* (2013.01); *G01J 5/0803* (2013.01); *G01J 5/0806* (2013.01); *G01J 2005/0077* (2013.01)

(58) Field of Classification Search
CPC ........ G01J 5/0025; G01J 5/026; G01J 5/0803; G01J 5/0806; G01J 2005/0077
See application file for complete search history.

(56) References Cited

U.S. PATENT DOCUMENTS 5,512,748 A 4/1996 Hanson
6,791,610 B1 9/2004 Butler et al.
(Continued)

FOREIGN PATENT DOCUMENTS

CN 204154391 U 2/2015
EP 1538579 A1 6/2005
(Continued)

OTHER PUBLICATIONS

European Application No. 22210235.2 filed Jan. 11, 2017; Extended European Search Report dated May 2, 2023; 6 pages.

(Continued)

*Primary Examiner* — Blake C Riddick
(74) *Attorney, Agent, or Firm* — CANTOR COLBURN LLP

(57) ABSTRACT

An infrared presence detector system includes a focal plane array and a processor coupled to the focal plane array. The array includes a first radiant energy sensor and a plurality of second radiant energy sensors, with the first and second radiant energy sensors configured to convert incident radiation into an electrical signal. The processor is coupled to the focal plane array, and is configured to control the focal plane array in a sleep mode, wherein the first radiant energy sensor is energized and the plurality of second radiant energy sensors are de-energized, and an active mode, wherein at least the plurality of second radiant energy sensors are energized when the first radiant energy sensor detects a presence.

10 Claims, 4 Drawing Sheets

Related U.S. Application Data

(60) Provisional application No. 62/277,314, filed on Jan. 11, 2016.

(51) Int. Cl.
*G01J 5/0803* (2022.01)
*G01J 5/0806* (2022.01)

(56) References Cited

U.S. PATENT DOCUMENTS

| | | |
|---|---|---|
| 7,795,859 B1 | 9/2010 | Lynch et al. |
| 8,766,808 B2 | 7/2014 | Hogasten |
| 8,830,316 B2 | 9/2014 | Jin et al. |
| 8,921,790 B2 | 12/2014 | Chalk et al. |
| 2006/0091310 A1 | 5/2006 | Furry |
| 2007/0120058 A1 | 5/2007 | Blackwell et al. |
| 2008/0316025 A1 | 12/2008 | Cobbinah et al. |
| 2009/0121925 A1 | 5/2009 | Scott et al. |
| 2009/0324015 A1 | 12/2009 | Way et al. |
| 2011/0279721 A1 | 11/2011 | Mcmahon |
| 2012/0006988 A1 | 1/2012 | Tatsuoka |
| 2012/0026337 A1 | 2/2012 | Boulanger et al. |
| 2012/0147531 A1 | 6/2012 | Rabii |
| 2012/0327242 A1 | 12/2012 | Barley et al. |
| 2014/0042319 A1 | 2/2014 | Pickett et al. |
| 2014/0139685 A1 | 5/2014 | Nussmeier et al. |
| 2014/0160299 A1 | 6/2014 | Mumaw |
| 2014/0176725 A1 | 6/2014 | Stuart et al. |
| 2014/0240528 A1 | 8/2014 | Venkataraman et al. |
| 2014/0253999 A1 | 9/2014 | Hegg |
| 2015/0206415 A1 | 7/2015 | Wegelin et al. |
| 2016/0178433 A1 | 6/2016 | Aphek |
| 2017/0150069 A1 | 5/2017 | Parrish et al. |
| 2017/0265034 A1 | 9/2017 | Yu et al. |
| 2018/0370034 A1 | 12/2018 | Lee et al. |

FOREIGN PATENT DOCUMENTS

| | | |
|---|---|---|
| WO | 2014138695 A1 | 9/2014 |
| WO | 2015109277 A1 | 7/2015 |

OTHER PUBLICATIONS

"Longwave Infrared [LWIR] Camera Module"; Flir Lepton; Retrieved Online from www.flir.com/lepton; Flir—The World's Sixth Sense; 2 Pages.

International Search Report Issued in International Application No. PCT/US2017/012929 mailed Nov. 7, 2017; 5 Pages.

Robert et al.; "Low Power Consumption Infrared Thermal Sensor Array for Smart Detection and Thermal Imaging Applications"; DOI 10.5162/irs2013/12.1; AMA Conferences 2013—Sensor 2013; OPTO 2013; IRS 2013; pp. 24-27.

Written Opinion Issued in International Application No. PCT/US2017/012929 mailed Nov. 7, 2017; 7 Pages.

INFRARED PRESENCE DETECTOR SYSTEM

CROSS REFERENCE TO RELATED APPLICATIONS

This application is a divisional of U.S. application Ser. No. 16/069,062, filed Jul. 10, 2018, which is a 371 National Stage of PCT/US2017/012929, filed Jan. 11, 2017, which claims the benefit of U.S. Provisional Application No. 62/277,314, filed Jan. 11, 2016, the contents of which are incorporated by reference herein in its entirety.

BACKGROUND

The present disclosure relates to a presence detector system, and more particularly, to an infrared focal plane array presence detector system.

Infrared detectors used for intrusion and presence detection are typically limited to pixel counts of about four-by-four (4×4) elements to stay reasonable in terms of cost and performance. Even with advances in MEMS, the pixel counts remain less than approximately one hundred-by-one hundred (100×100). The manufacturing process for these low cost detectors does not scale well in terms of cost as pixel count increases, Additionally, the physical size of an infrared focal plane array is large compared to the same pixel count for, as one example, complementary metal oxide silicon (CMOS) visible sensors because of the longer wavelength. As such, one-by-one (1×1) to four-by-four (4×4) pyroelectric elements are commonplace as, for example, occupancy detectors, but even in sizes up to approximately one hundred-by-one hundred (100×100) they are not able to count with the fidelity needed to achieve more efficiently controlled heating, ventilation, and air conditioning (HVAC) systems and lighting, Yet further, energy consumption of infrared focal plane arrays becomes large for arrays having sufficient pixels to meet fidelity needs when supporting other systems such as HVAC and lighting. Alternative, cost effective, methods are desirable to, for example, perform occupancy detection and people counting with improved fidelity and reduced energy consumption.

SUMMARY

An infrared presence detector system according to one, non-limiting, embodiment of the present disclosure includes a focal plane array including a first radiant energy sensor and a plurality of second radiant energy sensors, with the first and second radiant energy sensors configured to convert radiant energy into an electrical signal; and a processor coupled to the focal plane array and configured to control the first and second radiant energy sensors in a sleep mode wherein the first radiant energy sensor is energized and the plurality of second radiant energy sensors are de-energized, and an active mode wherein at least the plurality of second radiant energy sensors are energized when the first radiant energy sensor detects a presence.

Additionally to the foregoing embodiment, the first radiant energy sensor is configured to view a first scene and the plurality of second radiant energy sensors are configured to view a second scene.

In the alternative or additionally thereto, in the foregoing embodiment, the infrared presence detector system includes a first lens associated with the first radiant energy sensor for viewing a first scene; and a second lens associated with the plurality of second radiant energy sensors for viewing the first scene.

In the alternative or additionally thereto, in the foregoing embodiment, the first radiant energy sensor and the plurality of second radiant energy sensors are infrared sensors.

In the alternative or additionally thereto, in the foregoing embodiment, the infrared sensors are passive infrared sensors.

In the alternative or additionally thereto, in the foregoing embodiment, the infrared sensors are active infrared sensors.

In the alternative or additionally thereto, in the foregoing embodiment, the infrared presence detector system including a lens associated with the plurality of second radiant energy sensors for depicting a first scene; and a beam splitter disposed between the focal plane array and the lens, and configured to re-direct a portion of the radiant energy associated with the first scene onto the first radiant energy sensor.

In the alternative or additionally thereto, in the foregoing embodiment, the infrared presence detector system includes a second lens disposed between the beam splitter and the first radiant energy sensor.

In the alternative or additionally thereto, in the foregoing embodiment, the infrared presence detector system includes a power source including a plurality of power acquisition components.

In the alternative or additionally thereto, in the foregoing embodiment, the infrared presence detector system includes a wireless communication module configured to transmit and receive signals; and a substrate platform wherein the focal plane array, the processor, and the wireless communication module are integrated onto the substrate platform.

A method of operating an infrared presence detector according to another, non-limiting, embodiment includes operating at least one radiant energy sensor in an enabled mode when monitoring a scene; sustaining at least a first portion of a plurality of radiant energy sensors of a focal plane array in a disabled mode when the at least one radiant energy sensor is monitoring the scene; detecting a presence by the at least one radiant energy sensor; and operating at least the first portion of the plurality of radiant energy sensors in the enabled mode.

Additionally to the foregoing embodiment, the at least one radiant energy sensor is a second portion of the plurality of radiant energy sensors of the focal plane array.

In the alternative or additionally thereto, in the foregoing embodiment, the method includes applying wireless communication.

In the alternative or additionally thereto, in the foregoing embodiment, a first lens is configured to focus a radiated energy associated with at least a portion of the scene upon the second portion of the plurality of radiant energy sensors.

In the alternative or additionally thereto, in the foregoing embodiment, a second lens is configured to focus the radiated energy associated with the entire scene upon at least the first portion of the plurality of radiant energy sensors.

In the alternative or additionally thereto, in the foregoing embodiment, a segment of a radiated energy associated with the entire scene is diverted by a beamsplitter onto the at least one radiant energy sensor.

In the alternative or additionally thereto, in the foregoing embodiment, a remaining segment of the radiated energy is focused onto the first portion of the plurality of radiant energy sensors.

In the alternative or additionally thereto, in the foregoing embodiment, the presence is detected by a change over time of the radiated energy.

In the alternative or additionally thereto, in the foregoing embodiment, the method includes adjusting power consumption of a plurality of detector components to control at least one of instantaneous power consumption and average power consumption.

In the alternative or additionally thereto, in the foregoing embodiment, the at least one radiant energy sensor comprises a first radiant energy sensor and a second radiant energy sensor and the presence is detected by a difference in incident radiation between the first and second radiant energy sensors.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
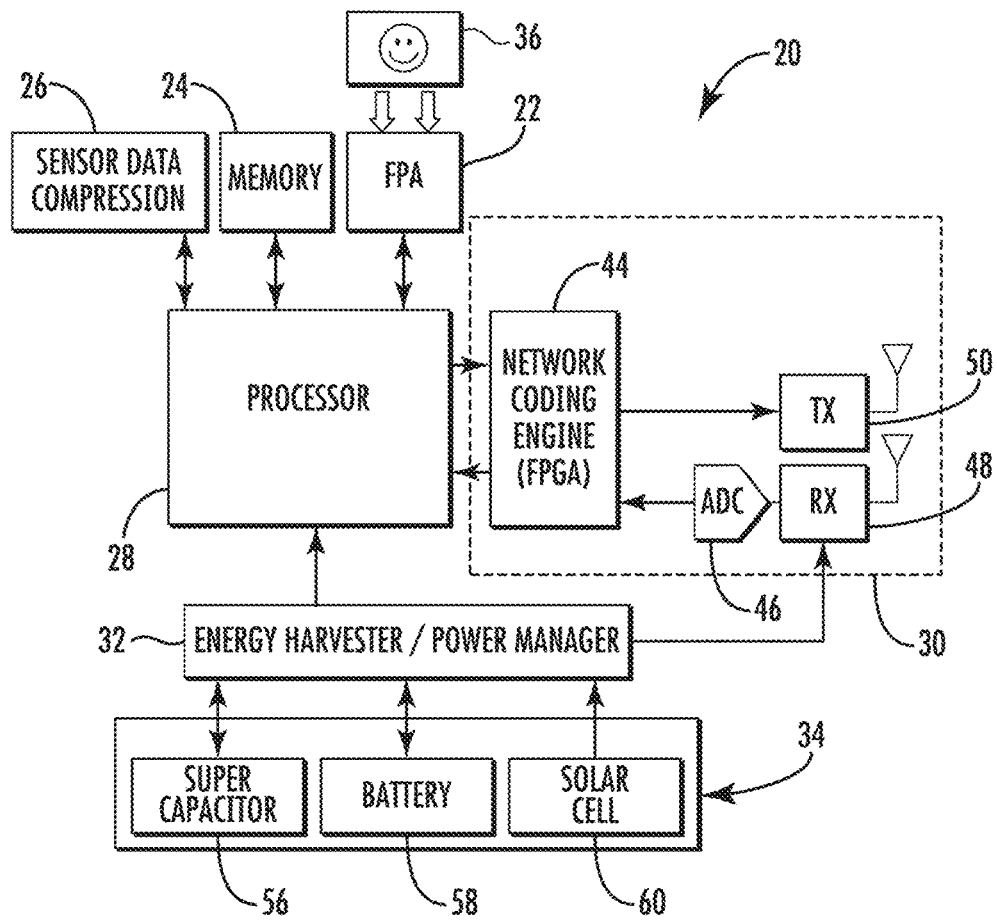
FIG. 1 is a schematic of an infrared presence detector system as one, non-limiting, exemplary embodiment of the present disclosure.

Referring to FIG. 1, an exemplary embodiment of a presence detector system 20 that may be an infrared presence detector system is illustrated. As one, non-limiting, example, the detector system 20 may facilitate the detection of occupancy and/or perform people counting in a given space. The detector system 20 may be part of a Building Control and/or Management System (not shown). For example, the Building Control System may, utilize the detector system 20 occupancy output data as part of a heating, ventilation and air conditioning (HVAC) system and/or lighting system to conserve energy. Other applications may include, but are not limited to, optimization of elevator, escalator and/or security systems. The detection system 20 may include a focal plane array (FRA) 22, a memory module 24, a sensor data compression block 26, a processor 28, a communication module 30, a power management module 32, and a power source 34.

Figure 2:
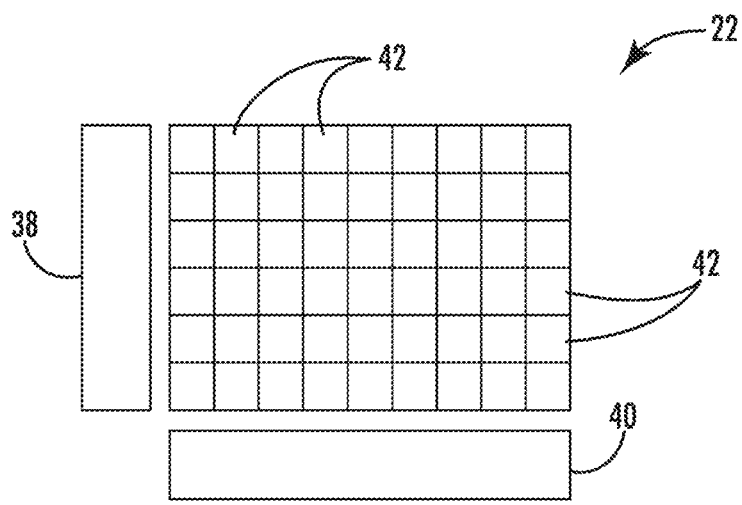
FIG. 2 is a schematic of a focal plane array of the infrared presence detector system.

Referring to FIGS. 1 and 2, the FPA 22 may be an infrared focal plane array configured to sense and detect radiated heat emitted by objects (e.g., persons) in a scene 36. The FPA 22 includes a row decoder 38, a column decoder 40, which are part of the Read-Out Integrated Circuit (ROIL), and a plurality of sensors 42 that may be infrared sensors arranged in a series of rows and columns (i.e., six rows and nine columns illustrated in FIG. 2). The row and column decoders 38, 40 are electrically coupled to the respective rows and columns of sensors 42, and are configured to receive intensity information (e.g., heat intensity) recorded over a time interval. As one example, the sensors 42 may be configured to sense radiated energy having a long infrared wavelength that may be within a range of about seven (7) to fifteen (15) micrometers. This range is a thermal imaging region, in which the sensors 42 may obtain a passive image of objects (e.g., the human body) only slightly higher than, for example, room temperature. This image may be based on thermal emissions only and requires no visible illumination.

The memory module 24 is generally a computer readable and writable storage medium and is configured to communicate with the processor 28 and generally stores intensity data from the FPA 22 for later processing, stores executable programs and their associated permanent data as well as intermediate data from their computation. The memory module 24 may be a random-access memory (RAM) that may be a ferroelectric RAM (FRAM) having relatively low power consumption with relatively fast write performance, and a high number of write-erase cycles. Other examples of a RAM may include a dynamic RAM (DRAM), and a non-volatile RAM (NVRAM) also called flash memory.

The radiant energy intensity information received by the decoders 38, 40 may be conditioned via a signal conditioning circuit (not shown) and then sent to the processor 28. The signal conditioning circuit may be part of the ROIC. Signal conditioning may include analog-to-digital converters and other circuitry to compensate for noise that may be introduced by the sensors 42. The processor 28 may be configured to provide focal plane scaling of the intensity value data received from the signal condition circuit and may further provide interpolation techniques generally known in the art. The processor 28 is generally, computer-based and examples may include a post-processor, a microprocessor and/or a digital signal processor.

The sensor data compression block 26 is known to one having skill in the art and is generally optional with regard to the present disclosure.

The communication module 30 is configured to send and receive information and commands relative to the operation of the detector system 20. The communication module 30 may include a network coding engine block 44, an ADC 46, a receiver 48 (e.g. wireless), and a transmitter 50 (e.g., wireless). The transmitter 50 may contain a DAC, power amplifiers, filters, impedance matching devices, and others (not shown), but is well known to one skilled in the art. Also, as is well-known in the art, the transmitter and receiver may be implemented as a transceiver or could be replaced by a well-known wired communication link (not shown). The network coding engine block 44 is configured to interface the input and output of the processor 28 to transmitter 50, receiver 48 (through ADC 46), provide encoding or decoding (e.g., for error detection and correction), security via encryption or authentication, and other features. The functions of communication module 30 may be affected, in total or in-part, by processor 28 that may include hardware and software to enable such functions.

The ADC 46 is configured to convert analog received information to digital information for eventual use by the processor 28. The ADC 46 may be implemented as part of the receiver 48 as is known by one skilled in the art. The network coding engine 44 provides any encoding and decoding necessary for error detection and correction, and/or security.

The receiver 48 is configured to receive wireless communication from other systems such as a HVAC control system, a security monitoring system, a transportation system, a building management system, or others, which provide functions that depend on the presence detection provided by detection system 20.

The transmitter 50 is configured to send wireless communications to other systems such as an HVAC control system, a security monitoring system, a transportation system, a building management system, or others, which provide functions that depend on the presence detection provided by detection system 20.

The power management module 32 is configured to control the power acquisition and power consumption of detection system 20 by controlling both the power source 34 and power consuming components. Such power consuming components may include the processor 28, the optional data compression block 26, the memory 24, the FPA 22 and the communication module 30 (e.g., network coding engine 44, transmitter 50, receiver 48, and ADC 46). In particular, the power consumption of processor 28 and memory 24 may be controlled by reducing the clock rate. It is contemplated and understood that other energy consuming components of the detector system 20 (not shown) may be controlled. Such control may simultaneously maintain detector system 20 functionality while maximizing life (i.e., the length of time detector system 20 can remain functional). In one embodiment, this control is achieved by receding horizon control (optimization). In alternative embodiments other control strategies such as model predictive control, fixed schedules, and others may be used.

The power management module 32 may also issue commands to the focal plane array 22 so as to turn off or turn on various pixel elements of the array 42 or place the ROTC of the focal plane array 42 in a quiescent low power state. This "sleep" or low power consumption mode will enable the device 20 to minimize power consumption when not required.

The power source 34 provides power to the detector system 20 and may include at least one of a super capacitor 56, a battery 58 and a solar cell 60. The power management module 32 is configured to draw power from any one of the power sources as dictated by the needs of the system. The power management module 32 may also facilitate a power scheduling function that controls the simultaneous use of the various on-chip component functions to minimize unwanted current spikes. It is contemplated and understood that other short-term energy storage devices may be used in place of the super capacitor 60, other long-term energy storage devices may be used in place of the battery 58, and other energy harvesting or recharging devices may be used in place of the solar cell 56 including power from a power grid.

The FPA 22 may also be operated without the use of an on-chip or external temperature reference as provided by, for example, a chopper. In this mode of operation, only motion is captured through the generation of an image derived from thermal variations due to motion. Such a mode of operation can be used to further reduce power consumption.

Figure 3:
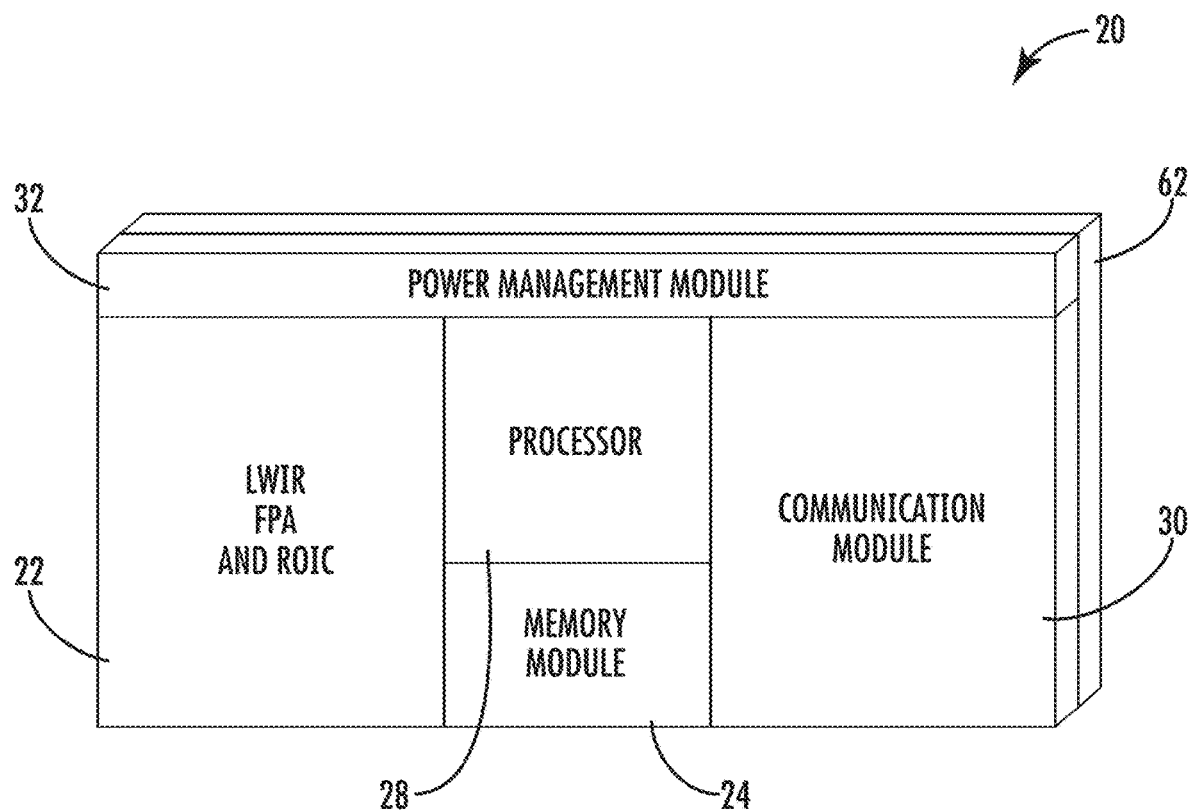
FIG. 3 is a perspective view of components of the infrared presence detector system integrated into a common substrate platform.

Referring to FIG. 3, the FPA 22 including the ROTC, the memory module 24, the processor 28, the power management module 32 and the communication module 30 may generally be integrated together on a single substrate platform or chip 62 that may be silicon-based. More specifically, the components may generally share the focal plane of the FPA 22. Together, the integrated components may be aimed toward minimal power consumption, small overall size/weight and low cost. Integration of these components may be further enhanced via a power scheduling function conducted by the power management module 32 as well as coordinated design of the individual functions of each component to work harmoniously. That is, the power scheduling function may, for example, minimize unwanted current spikes by controlling the simultaneous use of the various on-chip components functions.

For example, during operation the integrated components of the detector 20 may be configured to transition to a sleep mode when there is no active movement in the field of view. More specifically and until movement is detected, the detector 20 may operate with only a limited excitation current (e.g., nano amperage), with only a few of the plurality of sensors 42 being turned on to detect gross motion. Once gross motion is detected, and/or by receiving a wireless trigger signal to wake via the receiver 48 of the communication module 30, the detector 20 may be made to transition to a full capability mode, or conversely, may be wirelessly commanded to a low level power safe/consumption mode. Alternatively, the detector 20 may automatically transition into the sleep mode in the event of non-movement or an unchanged occupancy or presence state.

By placing individual subsystem components on the same die or chip, signal integrity, resistive losses and security is generally improved through elimination of interconnects and sources of extraneous electrical and radiative noise typically present in systems with similar functionality but that use several individually packaged integrated circuits (IC's). Moreover, by placing all components on the same substrate platform, economy of scale is achieved that enables chip-scale cost reduction. Yet further, power management and consumption may be optimized potentially achieving long life battery operation, and facilitating packaging of various circuitry components on a single chip.

Figure 4:
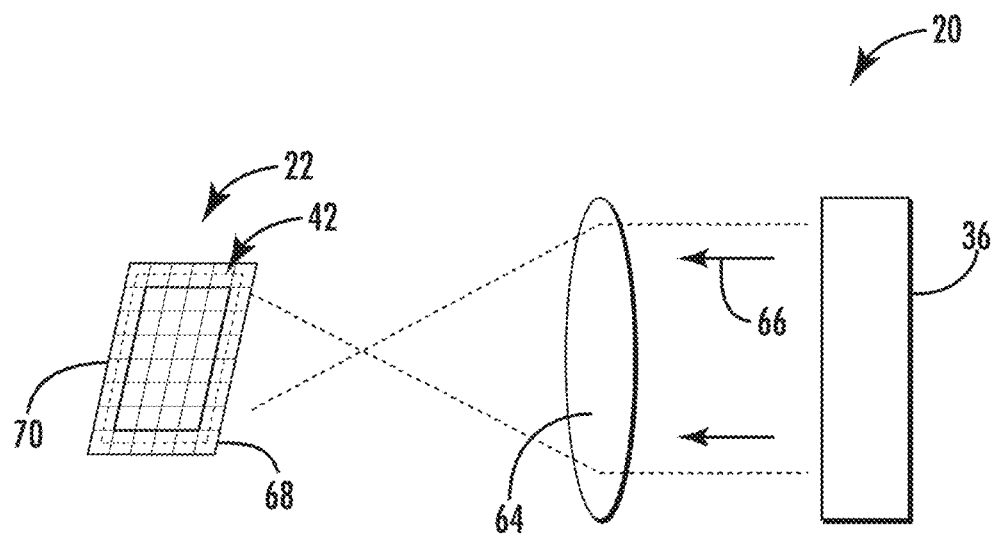
FIG. 4 is a schematic of the infrared presence detector system illustrating radiant energy incident upon a focal plane array of the infrared presence detector system.

Referring to FIG. 4, the detector system 20 may include a lens 64 generally located between the monitored scene 36 and the EPA 22 such that the EPA 22 is located on a focal plane (not shown) of the lens 64. In operation, energy (see arrows 66) radiated by objects in the scene 36 are focused through the lens 64 and imparted upon the FPA 22 as incident radiation.

As previously described, the detector system 20 may be configured (i.e., via the processor 28 and the power management module 32) to operate in a sleep mode when a presence in the scene 36 is not detected, and initialize to an active mode upon detection of a presence. To initially detect such a presence, a selected few or a first portion 68 of the plurality of radiant energy sensors 42 may be enabled to monitor the scene while a remaining portion 70 of the radiant energy sensors 42 is disabled. When a sensor 42 is enabled, the sensor may draw power from the power source 34, and when the sensor is disabled, the sensor draws minimal or no power. For purposes of conserving power (i.e., preserving battery life), the number of sensors of the first portion 68 may be substantially less than the number of sensors in the second portion 70.

As illustrated in FIG. 4, the first portion 68 may comprise sensors that are generally located about the periphery of the FPA 22. In such a configuration, the first portion 68 of sensors 42 may be configured to monitor a periphery of the scene 36 and the second portion 70 may be configured to detect a presence within the interior of the scene periphery. For example, if the scene is a predefined space, when a person crosses the periphery of the scene 36, the first portion 68 of the sensors 42 will detect the presence and enable the second portion 70 to further interrogate the presence within the scene periphery. It is further contemplated and understood that the scene 36 may be the inside of a room. In such an example, the first portion 68 of sensors 42 may not monitor a complete periphery, and instead, may monitor area(s) adjacent to a door and/or window.

Figure 5:
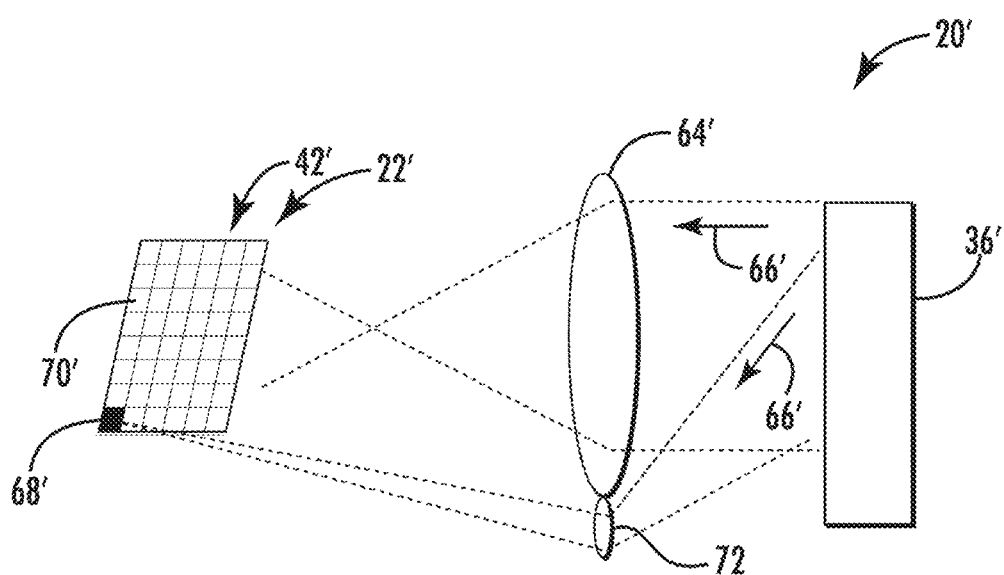
FIG. 5 is a schematic of a second embodiment of the infrared presence detector system.

Referring to FIG. 5, a second embodiment of a detector system is illustrated wherein like elements to the first embodiment have like identifying numerals except with the addition of a prime symbol suffix. A detector system 20' includes a FPA 22' having at least one radiant energy sensor or first portion 68' of a plurality of sensors 42' one illustrated) configured to be enabled when the detector system 20' is in a sleep mode. A second portion 70' of the sensors 42' may be a remaining portion and may be configured to turn on (i.e. enabled) when the detector system 20' initializes into an active mode. A first lens 64' may be constructed and arranged to transmit radiated energy 66' from an entire scene 36' and transpose the energy upon the sensors 42' as incident radiation. As illustrated, this incident radiation is detected by both portions 68', 70' of the sensors 42'. The detector system 20' may further include a second lens 72 arranged to transmit radiated energy 66' from the entire scene 36' and transpose the energy upon the first portion 68' of the sensors 42'. It is further contemplated and understood that the second lens 72 may be arranged to transmit radiated energy from all or only from a pre-selected segment of the scene 36. It is further contemplated that the second lens 72 may be physically part of lens 64' (an integrated lens with a plurality of focal lengths) or may be interposed in the light, path of lens 64'.

Figure 6:
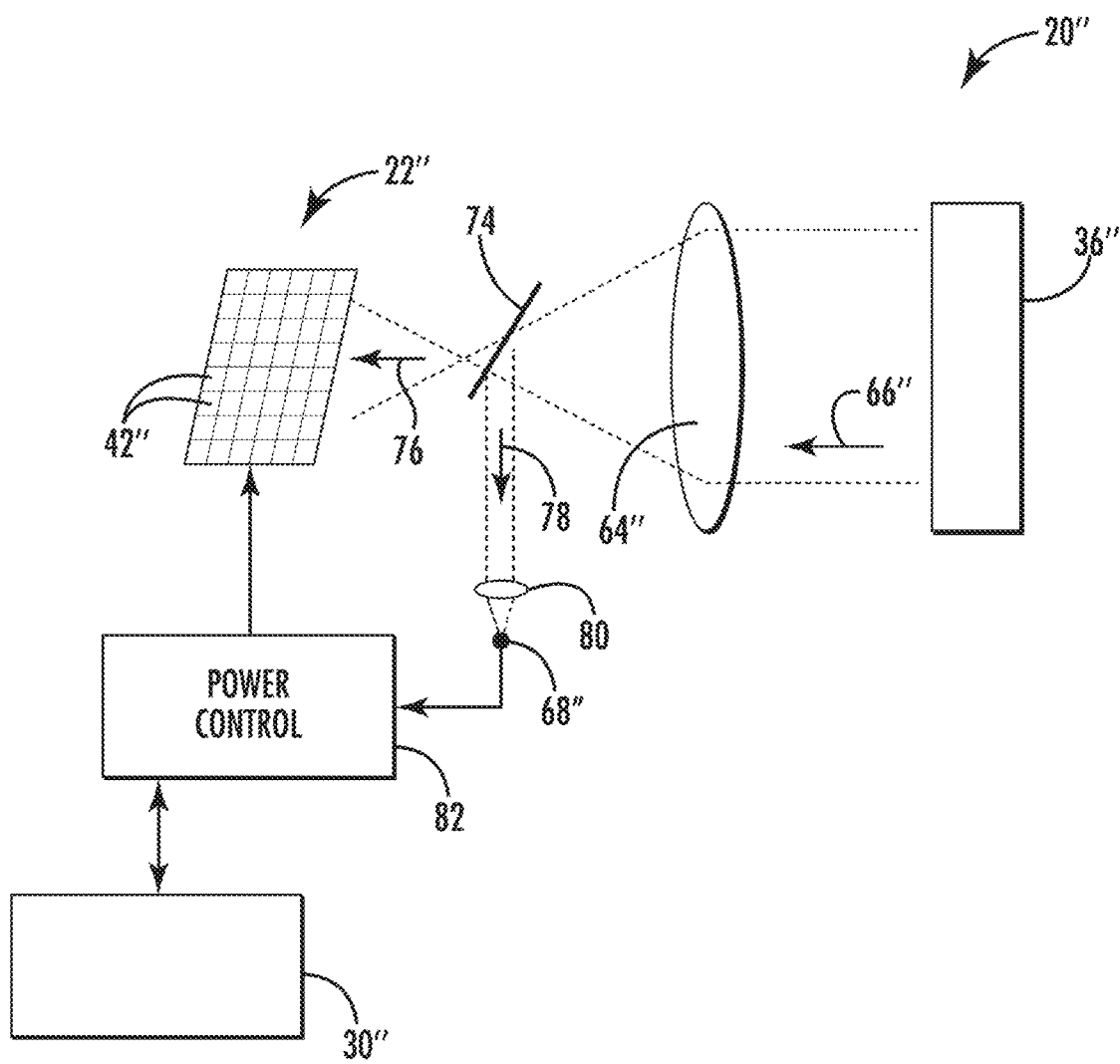
FIG. 6 is a schematic of a third embodiment of the infrared presence detector system.

Referring to FIG. 6, a third embodiment of a detector system is illustrated wherein like elements to the first and second embodiments have like identifying numerals except with the addition of a double prime symbol suffix. A detector system 20" includes a FPA 22" having a plurality of sensors 42" configured to be enabled when the detector system 20" is in an active mode. At least one distinct radiant energy sensor 68" that may be separate from the FPA 22" is configured to be enabled when the detector system 20" is in at least the sleep mode. A first lens 64" may be constructed and arranged to transmit radiated energy 66" from an entire scene 36" and to a beamsplitter 74 of the detector system 20". The beamsplitter 74 is configured to transmit a portion 76 of the radiated energy 66" to the radiant energy sensors 42" of the FPA 22" and a second portion 78 to the distinct radiant energy sensor 68", A second lens 80 of the detector system 20" may be located between the beamsplitter 74 and the distinct radiant energy sensor 68". Examples of a beamsplitter may include a dichroic mirror and others. It is further contemplated and understood that the radiant energy sensor 68" may not be distinct, and may be a portion of the FPA 22".

During operation of the detector system 20", the beamsplitter 74 redirects a portion 78 of the radiated energy 66" through the lens 80 which focuses the energy upon the enabled radiant energy sensor 68". If a presence is detected by the radiant energy sensor 68", the radiant energy sensor may output a signal to a power controller 82 that may be part of, for example, the power management module 32 (see FIG. 1). The power controller 82 may then transition the detector system 20" from the sleep mode and into the active mode, thus enabling the radiant energy sensors 42" of the FPA 22". When in the active mode, the detector system 20" may be configured to communicate with and support various systems such as a HVAC control system, a security monitoring system, a transportation system, a building management system, and others. This communication is through a communication module 30" and may be wireless and the detector system 20" may, in itself, be wireless and powered by, for example, the batteries 58 (see FIG. 1).

Benefits of the present disclosure include a presence detector system 20" having a sleep mode such that a majority of the system may remain in a low-power or un-powered mode while little is happening in the field of view (i.e. the scene 36), but is capable of resuming full power operation when appropriate. This ability to shift between sleep and active modes of operation conserves stored energy of the power source 34. In application where the power source is, for example, a battery, the detector system 20 may be generally, wireless and may communicate wirelessly with outside systems such as a Building Management System.

Other benefits of the present disclosure include a detector 20 that is suited for intrusion detection, and that may respond only to motion and therefor may inherently select motion-based intrusion as opposed to steady state hot objects. Moreover, the detector may offer only enough resolution and sensitivity to count persons, and therefore will not create invasion of privacy concerns. The detector 20 may be built upon a ferroelectric memory platform using either active or passive detection; and, may be built upon a thermal isolator rather than a MEMS bridge, thereby improving yield, reducing across device response variations, and may be compatible with wafer production having small feature sizes.

While the present disclosure is described with reference to exemplary embodiments, it will be understood by those skilled in the art that, various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating an infrared presence detector comprising:
    operating at least one radiant energy sensor in an enabled mode when monitoring a scene;
    sustaining at least a first portion of a plurality of radiant energy sensors of a focal plane array in a disabled mode when the at least one radiant energy sensor is monitoring the scene;
    wherein the at least one radiant energy sensor and the plurality of radiant energy sensors comprise infrared sensors;
    detecting a presence by the at least one radiant energy sensor; and
    operating at least the first portion of the plurality of radiant energy sensors in the enabled mode.

2. The method set forth in claim 1, wherein the at least one radiant energy sensor is a second portion of the plurality of radiant energy sensors of the focal plane array.

3. The method set forth in claim 2, wherein a first lens is configured to focus a radiated energy associated with at least a portion of the scene upon the second portion of the plurality of radiant energy sensors.

4. The method set forth in claim 3, wherein a second lens is configured to focus the radiated energy associated with the entire scene upon at least the first portion of the plurality of radiant energy sensors.

5. The method set forth in claim 1 comprising:
    applying wireless communication.

6. The method set forth in claim 1, wherein a segment of a radiated energy associated with the entire scene is diverted by a beamsplitter onto the at least one radiant energy sensor.

7. The method set forth in claim 6, wherein a remaining segment of the radiated energy is focused onto the first portion of the plurality of radiant energy sensors.

8. The method set forth in claim 1, wherein the presence is detected by a change over time of the radiated energy.

9. The method set forth in claim 1 further comprising:
adjusting power consumption of a plurality of detector components to control at least one of instantaneous power consumption and average power consumption.

10. The method set forth in claim 1, wherein the at least one radiant energy sensor comprises a first radiant energy sensor and a second radiant energy sensor and the presence is detected by a difference in incident radiation between the first and second radiant energy sensors.

* * * * *